Patented Mar. 9, 1937

2,073,116

UNITED STATES PATENT OFFICE 2,073,116

VAT DYESTUFF PREPARATIONS

Joseph Nuesslein and Gerhard Balle, Frankfort-on-the-Main, Germany, assignors to General Aniline Works, Inc., New York, N. Y., a corporation of Delaware No Drawing. Application December 18, 1934, Serial No. 758,140. In Germany December 21, 1933

6 Claims. (Cl. 8—6)

The present invention relates to vat-dyestuff preparations.

We have found that an especial good effect is obtained in printing with vat-dyestuffs by using vat dyestuff preparations which contain substances of the following general formula:

wherein R means hydrogen, alkyl, aryl or aralkyl and Z stands for the radical of a monosaccharide.

As substances of this general formula there may be mentioned, for instance: glucamine, methylglucamine, butylglucamine, phenylglucamine, benzylglucamine, oxethylglucamine, ethylenediglucamine, diethylglucamine, dioxethylglucamine, butylxylamine, methylfructamine. These substances may be prepared for instance, by catalytically reducing sugars in the presence of ammonia or aliphatic or aromatic or mixed aliphatic-aromatic amines which may also be substituted. These substances may directly be mixed with the dyestuffs or may be added to the printing pastes together with the admixtures, usually applied in printing processes, such as, for instance, glycerol, thiodiglycol and thickening agents.

The vat-dyestuff preparations may be used in direct printing as well as in discharge and resist printing processes.

The following examples serve to illustrate the invention, but they are not intended to limit it thereto, the parts are by weight:

(1) 75 parts of the dyestuff No. 1279, "Schulz, Farbstofftabellen", 7th edit. (double paste, fine) are intimately mixed with 80 parts of glycerol, 110 parts of water, 500 parts of wheat-starch-tragacanth thickening, 120 parts of potassium carbonate, 75 parts of sodium formaldehyde-sulfoxylate and 40 parts of butylglucamine.

The printing color is printed in the usual manner on vegetable or animal fibers, such as natural silk. The material is then dried, steamed in a suitable manner, rinsed with or without addition of an oxydizing agent, soaped while hot, rinsed and dried. A print is obtained which has a deeper shade than that of the print prepared without addition of butylglucamine.

(2) 100 parts of the dyestuff No. 1269, "Schulz, Farbstofftabellen", 7th edit., (in the form of a finely concentrated paste) are intimately mixed with 80 parts of glycerol, 45 parts of water, 500 parts of wheat-starch-tragacanth thickening, 120 parts of potassium carbonate, 75 parts of sodium formaldehyde-sulfoxylate and 80 parts of phenylglucamine.

The material is printed and after-treated as described in Example 1. The fixation occurs more quickly and the unreduced print is essentially more stable than that prepared without addition of phenylglucamine.

(3) 75 parts of the dyestuff No. 1228, "Schulz, Farbstofftabellen", 7th edit. (double paste, fine) are intimately mixed with 60 parts of glycerol, 110 parts of water, 500 parts of wheat-starch-tragacanth thickening, 120 parts of potassium carbonate, 75 parts of sodium formaldehyde-sulfoxylate and 40 parts of glucamine.

The material is printed and after-treated as described in Example 1.

(4) 80 parts of the dyestuff No. 1269, "Schulz, Farbstofftabellen", 7th edit. (powder) are carefully mixed with 40 parts of benzylglucamine in a suitable manner. The dyestuff powder thus obtained may be used for the manufacture of normal printing colors.

We claim:

1. Dyestuff preparations containing a vat-dyestuff and a compound of the following general formula:

wherein R stands for hydrogen, alkyl, aryl or aralkyl and Z stands for the radical of a compound of the group consisting of pentoses and hexoses.

2. Dyestuff preparations containing a vat-dyestuff and a compound of the following general formula:

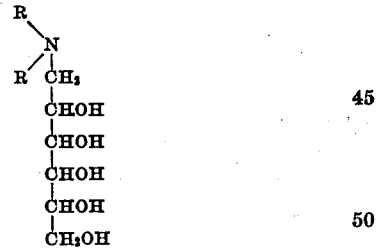

wherein R stands for hydrogen, alkyl, aryl or aralkyl.

3. Dyestuff preparations containing a vat-dyestuff and a compound of the following general formula:
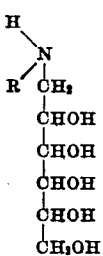
wherein R stands for alkyl, aryl or aralkyl.
4. The dyestuff preparation containing a vat-dyestuff and glucamine.
5. The dyestuff preparation containing a vat-dyestuff and phenylglucamine.
6. The dyestuff preparation containing a vat-dyestuff and butylglucamine.
JOSEPH NUESSLEIN.
GERHARD BALLE.